(12) United States Patent
Hawes

(10) Patent No.: US 6,206,532 B1
(45) Date of Patent: Mar. 27, 2001

(54) HIGH EFFICIENCY LIGHT SOURCE PROJECTION APPARATUS

(75) Inventor: Edward Maxwell Hawes, Winchester (GB)

(73) Assignee: New Exciting Designs Limited, Bedfordshire (GB)

(*) Notice: Subject to any disclaimer, the term of this patent is extended or adjusted under 35 U.S.C. 154(b) by 0 days.

(21) Appl. No.: 09/293,704

(22) Filed: Apr. 16, 1999

(30) Foreign Application Priority Data

Oct. 17, 1996 (GB) .................................................. 9621635
Oct. 17, 1997 (GB) .................................. PCT/GB97/02758

(51) Int. Cl.$^7$ ........................................................ F21V 9/14
(52) U.S. Cl. ............................. 362/19; 359/485; 359/495
(58) Field of Search .................................... 362/3, 16, 17, 362/18, 19, 317, 351; 359/485, 494, 495, 496, 500

(56) References Cited

U.S. PATENT DOCUMENTS

| 3,508,809 | * | 4/1970 | Wilder et al. | 359/495 |
|---|---|---|---|---|
| 5,044,730 | | 9/1991 | LaDuke et al. | 359/890 |
| 5,172,254 | | 12/1992 | Atarashi et al. | 359/41 |
| 5,282,121 | | 1/1994 | Bornhorst et al. | 362/294 |
| 5,283,600 | | 2/1994 | Imai | 353/34 |
| 5,696,564 | * | 12/1997 | Hatakeyama | 348/756 |
| 5,709,463 | * | 1/1998 | Igram | 362/268 |
| 5,748,376 | * | 5/1998 | Lin et al. | 359/629 |
| 5,828,485 | | 10/1998 | Hewlett | 359/291 |
| 5,833,338 | * | 11/1998 | Barak | 353/20 |

FOREIGN PATENT DOCUMENTS

| 0361559 | 4/1990 | (EP) | H04N/9/31 |
|---|---|---|---|
| 0435288 | 7/1991 | (EP) | H04N/9/31 |
| 0492636 | 7/1992 | (EP) | H04N/9/31 |
| 61090584 | 5/1986 | (JP) | H04N/5/74 |
| 1201693 | 8/1989 | (JP) | G09F/9/00 |
| 9852386 | 11/1998 | (WO) . | |
| 9909351 | 2/1999 | (WO) . | |

* cited by examiner

Primary Examiner—Thomas M. Sember
Assistant Examiner—Ismael Negron
(74) Attorney, Agent, or Firm—Sheridan Ross P.C.

(57) ABSTRACT

A light projection apparatus includes a source of unpolarized light. The light passes to a first polarizing means that converts substantially all of the light incident on the polarizing means from the source into polarized light. The first polarizing means is preferably a polarizing cube beam splitter. The light passes to image means, which preferably includes a liquid crystal cell, for generating an image to be projected. A second polarizing means such as a polarizing cube beam splitter is provided optically after the image means for receiving light passing through the image means and passing a first beam having a first planar polarization and deflecting a second beam having a second planar polarization, at least one of the first and second beams providing a projected image.

19 Claims, 6 Drawing Sheets

(12)  United States Patent US 6,206,532 B1

HIGH EFFICIENCY LIGHT SOURCE PROJECTION APPARATUS

TECHNICAL FIELD OF THE INVENTION

The present invention relates to a light projection and lighting effects system and methods.

BACKGROUND OF THE INVENTION

Various light projection systems are known. One particular system that is used for producing special lighting effects uses a powerful light source to project light through a metal slide (called a "gobo") which is then focused to produce an image. The light beam can be moved by a motorized mirror. In addition, the gobo itself can be rotated. A number of gobos can be loaded into a projector and selected at will. The gobos have different patterns so that a variety of patterns of different shapes can be projected onto a wall or other screen as well as to provide varied beam profile effects. However, the images that can be projected are limited to the particular gobos that are being used. There is no possibility of generating sophisticated images. There is obviously also no possibility of projecting video images when slides are used for carrying the image.

Attempts have been made in the past to project light through a liquid crystal display so as to produce a projection image that can be varied by appropriate control of the liquid crystal cells/pixels that make up the liquid crystal display. However, the problem with liquid crystal displays is that polarizing plates are placed either side of the liquid crystal cells, the front polarizing plate being conventionally known as the polarizer and the rear polarizing plate being conventionally known as the analyzer. Unpolarized light is caused to be incident on the polarizer. Only light having the appropriate planar polarization passes through the polarizer and light of the orthogonal planar polarization is absorbed by the polarizer so that it is not transmitted. However, this absorption of half of the incident light causes the polarizer to heat up significantly when a bright light source is used. The heat build up in the polarizer can cause heating of the liquid crystal in the liquid crystal cells by conduction of heat from the polarizer, causing breakdown of the device. Similarly, some of the light passing through the analyzer on the opposite side of the liquid crystal cells is absorbed by the analyzer, again causing heating of the liquid crystal and possible breakdown. Light intensity is lost because of the absorption of light by the polarizer. Increasing the intensity of the light source serves only to increase the undesirable heating in the system. Thus, it has not to date been possible to project images through a liquid crystal display that are bright enough for the resultant image to be projected for special lighting effects applications.

Notwithstanding the problems mentioned above, many systems have been described in the prior art for projection of light through a liquid crystal device. Many of such systems are for projection of video images (such as for a film or "movie"). However, in a video image projector, it is fair to say that on average each individual cell or pixel in the liquid crystal device is on for approximately half of the time and off for the other half of the time the device is used and thus heat build up in the analyzer is not a particular problem. In contrast, in a lighting effects system, a particular cell or pixel may be on or off for many minutes or even hours at a time. Accordingly, localized heat build up is potentially a major problem in a lighting effects system using liquid crystal displays. Furthermore, a lighting effects system often has to illuminate across large distances (perhaps a hundred meters or more when used in a stadium, for example), requiring the use of powerful light sources. In contrast, video image projectors are being proposed for use often in a domestic environment where the distance from the projector to the screen may only be a few meters, meaning that much lower power light sources can be used in a video image projector.

U.S. Pat. No. 5,172,254 discloses a light projector. Light from a source is split into two beams of different polarizations, which are then passed through their own respective liquid crystal devices. Light emerging from the respective liquid crystal devices is then recombined to produce a final image for projection onto a screen. A color system is also disclosed in which multiple liquid crystal devices are used. However, the use of plural liquid crystal devices makes the system difficult to set up as the liquid crystal devices for each beam must be very accurately aligned. This is an important issue in a special lighting effects projector that is often subject to rough handling in transit and in use.

U.S. Pat. No. 5,282,121 discusses the problem of heat build-up because of absorption by the polarizer in a liquid crystal display used in a lighting effects system. The solution to that problem as disclosed in the '121 patent is to use a scattering liquid crystal cell in the lighting effects system. However, the use of a scattering liquid crystal cell means that sophisticated cooling arrangements are required to keep down the temperature of the system components in the invention as disclosed in the '121 patent.

U.S. Pat. No. 5,283,600 discloses an LCD projector that uses a polarizing beam splitter to provide beams of light having orthogonal polarizations that are passed through a liquid crystal device having a polarizer and an analyzer.

SUMMARY OF THE INVENTION

According to a first aspect of the present invention, there is provided light projection apparatus, the apparatus comprising: a source of unpolarized light; first polarizing means for converting substantially all of the light incident on the first polarizing means from the source into polarized light; image means for generating an image to be projected and through which the polarized light is directed for projected display of said image; and, a polarizing beam splitter provided optically after the image means for receiving light passing through the image means and passing a first beam having a first planar polarization and deflecting a second beam having a second planar polarization, at least one of the first and second beams providing a projected image.

The invention includes lighting effects apparatus including light projection apparatus as described above.

The polarizing beam splitter is preferably a polarizing cube beam splitter. (It will be understood that whilst reference is made herein to a polarizing "cube" beam splitter, the beam splitter need not be strictly cubic and may have a rectangular cross-sectional shape, for example.)

According to a second aspect of the present invention, there is provided lighting effects apparatus, the apparatus comprising: a source of unpolarized light; first polarizing means for converting substantially all of the light incident on the polarizing means from the source into polarized light; image means for generating an image to be projected and through which the polarized light is directed for projected display of said image; and, second polarizing means provided optically after the image means for receiving light passing through the image means thereby to provide a projected lighting effect.

Because substantially all of the light incident on the first polarizing means is converted into polarized light, and half is not lost to a conventional polarizer as in the prior art, the image can be practically twice as bright for the same power light source. Also, significant heating of the first polarizing means does not take place because half of the light is not absorbed by the first polarizing means as happens with a conventional polarizer. This prevents overheating of the system components, especially the often vulnerable image means. It also means that a more powerful light source can be used because little, if any, light is lost that might otherwise cause heating of the system components. This is especially important in a lighting effects apparatus that typically requires very bright images and uses powerful light sources.

Where a polarizing beam splitter is provided optically after the image means, again, this serves to prevent components of the apparatus from overheating. This is especially advantageous in lighting effects apparatus in which a particular liquid crystal pixel, for example, may be continuously on for many minutes or even hours at a time. It also allows a negative of the projected image to be obtained, which may have application in special lighting effects.

The light projection apparatus described above may be used in a video projection system. Video images (i.e. moving images) may be digitally stored and transmitted to the image means for projected display. Thus, there may be means for digitally storing video images and transmitting said images to the image means for projected display.

According to a third aspect of the present invention, there is provided a method of light projection, the method comprising the steps of: passing unpolarized light to first polarizing means that converts substantially all of the light incident on the polarizing means from the source into plane polarized light; directing the polarized light through image means that generates an image to be projected for projected display of said image; and, passing the light that passes through the image means through a polarizing beam splitter that passes a first beam having a first planar polarization and deflects a second beam having a second planar polarization, at least one of the beams providing a projected image.

A method of providing lighting effects may include a light projection method as described above.

A method of providing video images may include a lighting projection method as described above.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
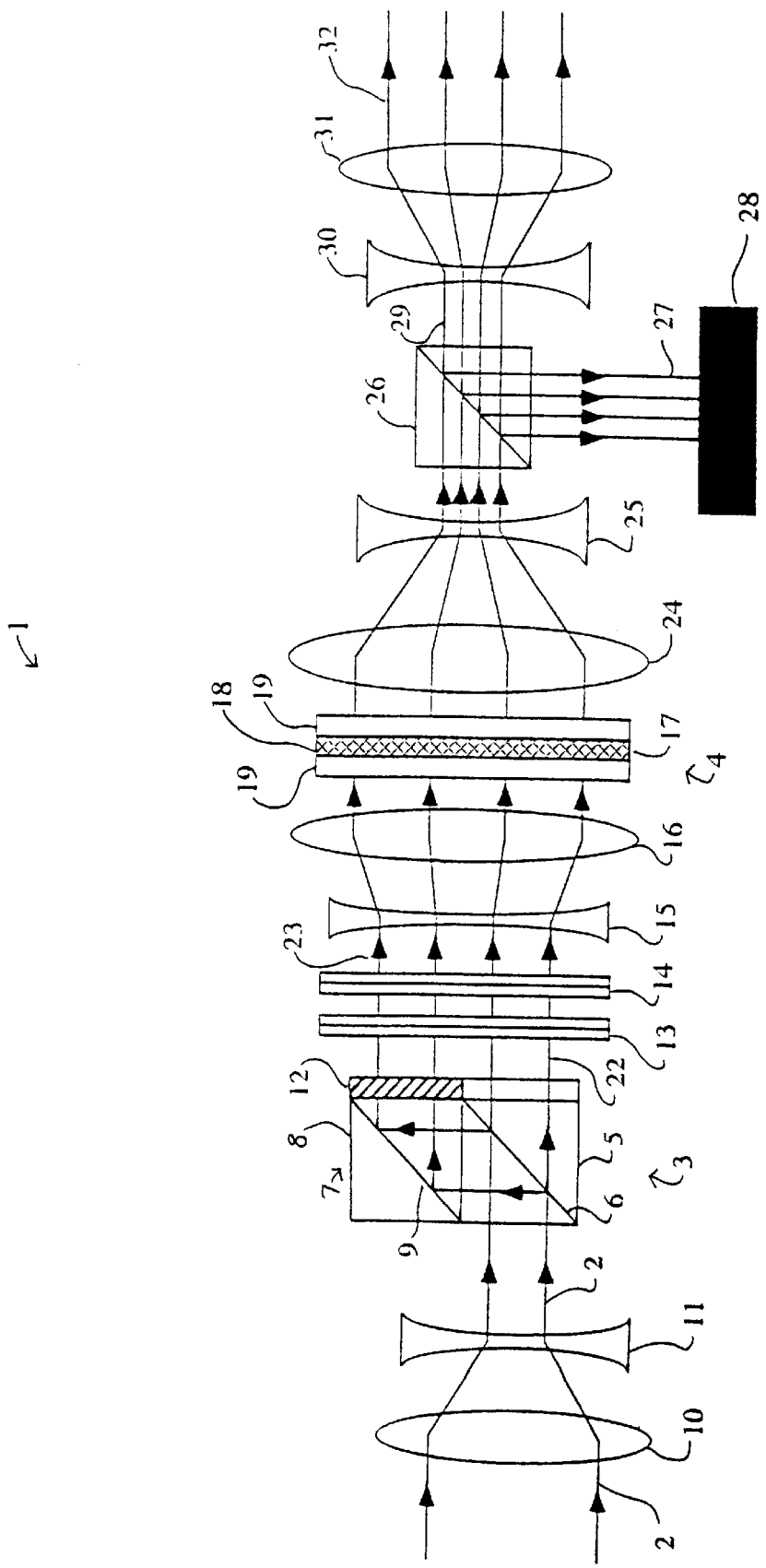
FIG. 1 is a schematic elevation of a first embodiment of a system of the present invention.
Figure 2:
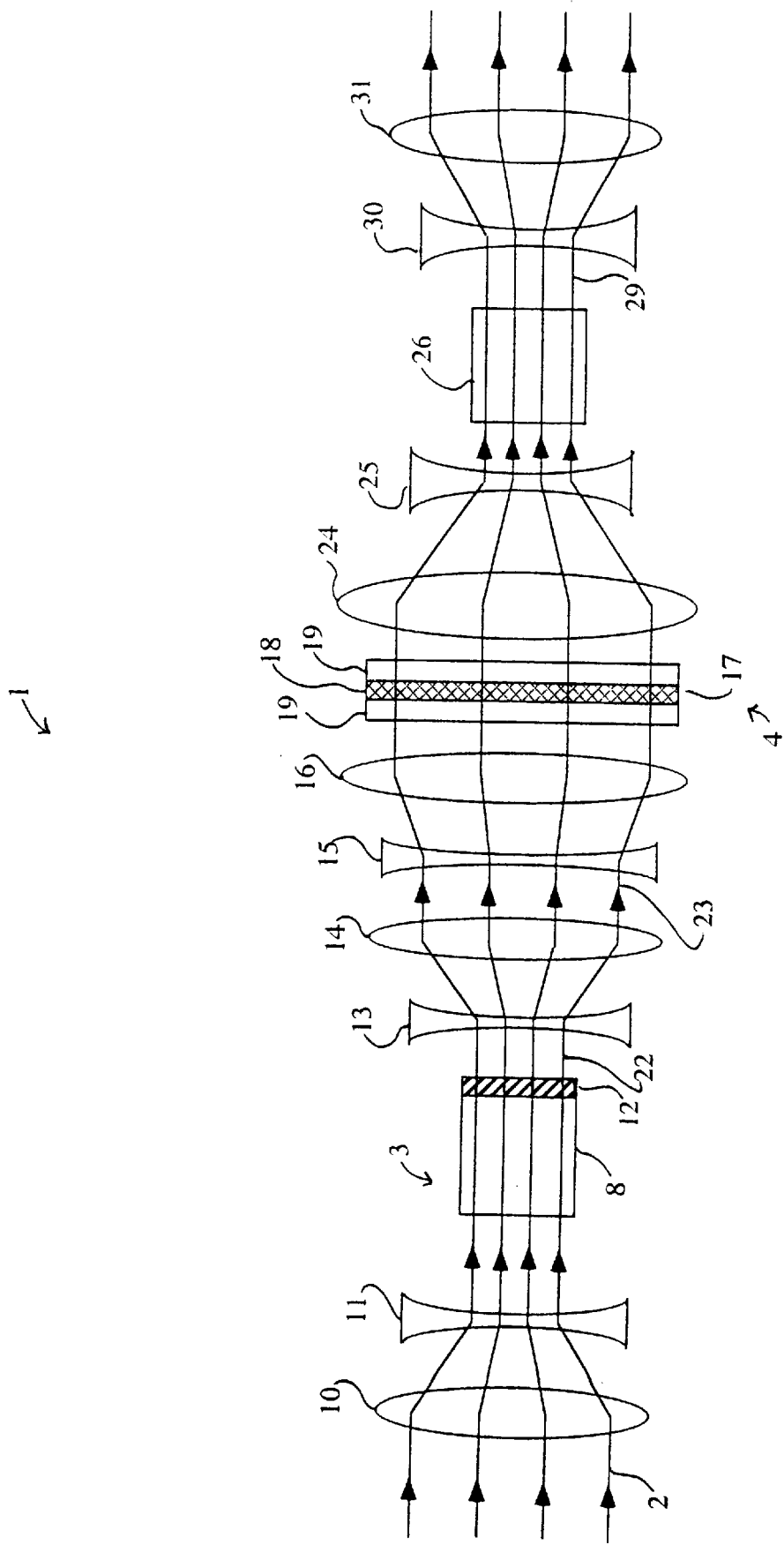
FIG. 2 is a schematic plan view of the example of FIG. 1.
Figure 3:
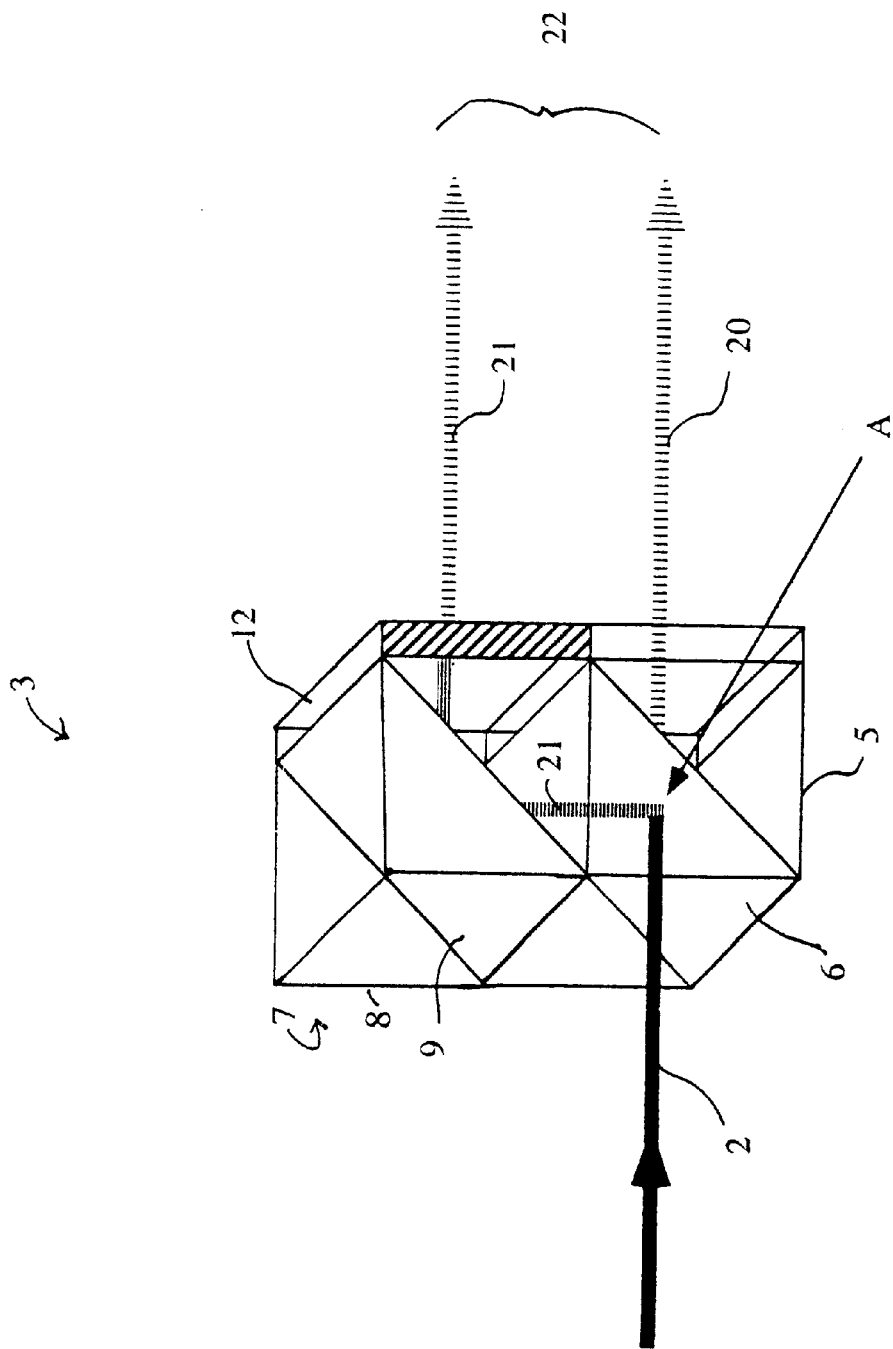
FIG. 3 is a perspective schematic view of a preferred polarizing means.

Referring to FIGS. 1 to 3 of the drawings, a light projection system 1 has as its main components a source of unpolarized light (not shown), polarizing means 3, and image means 4.

The source of unpolarized light can be a conventional high power light bulb, typically of power 1.2 to 5 kW, light from which passes through appropriate optical components. The unpolarized light 2 passes through a converging lens 10 and a diverging lens 11, which reduce the width of the light beam to a size suitable for entering the polarizing means 3.

Polarizing means 3, shown in more detail in FIG. 3, comprises a polarizing cube beam splitter 5 into which the unpolarized light 2 passes. A birefringent layer 6 is formed across one diagonal of the polarizing cube beam splitter 5 in a known manner as shown. The polarizing cube beam splitter 5 is "tuned" so that it only operates on specific wavelengths of light. Polarizing cube beam splitters 5 are available to cover the optical range of 450 to 700 nm and which have broad band anti-reflection coatings to minimize reflection losses at boundaries.

The unpolarized light 2 which is incident on the polarizing cube beam splitter 5 is divided into its two components of plane polarization (the "p" and "s" polarizations). The "p" component 20, which may be polarized in the vertical direction in the drawings for example, passes straight through the polarizing cube beam splitter 5. The "s" component 21, which may be polarized in the horizontal direction in the drawings, is reflected upwards by the birefringent layer 6 as indicated at "A". Deflection means 7, which can be formed by a deflecting cube 8 having a planar mirror 9 across one diagonal or a right angled prism for example, is fitted on top of the polarizing cube beam splitter 5 to receive the deflected s component light beam 21. The deflected s component light beam 21 is reflected by the mirror 9 so as to travel in the same direction as the first transmitted p component light beam 20. A half-wave plate 12 is fixed to the surface of the deflecting cube 8 through which the deflected s component light beam 21 exits. The half-wave plate 12 rotates through 90° the polarization of light that passes through the half-wave plate 12. Thus, the polarization of the deflected s component light beam 21 after emerging from the half-wave plate 12 is in the same plane or direction as the polarization of the transmitted polarized p component light beam 20, which was transmitted directly by the polarizing cube beam splitter 5.

It will be appreciated that substantially all of the light incident on the polarizing means 3 is converted into plain polarized light emitted in the same direction. The only losses are the practically negligible losses at any boundaries, such as at the birefringent layer 6, the mirror 9, and the surfaces of the cubes 5, 8 through which light passes. In contrast, in the prior art, when light is polarized by passing through a conventional polarizer prior to entry into a liquid crystal cell, only half of the light is polarized. The other half is absorbed by the polarizer, leading to loss of light intensity and also to heating of the polarizer. Where the light source is bright (as required for a projection system), the heating of the polarizer can be substantial and has conventionally ruled out the possibility of using a liquid crystal in a projection system of this type.

The beam 22 of p and s component light emerging from the polarizing means 3, which consists of the separate polarized light beams 20, 21 discussed above, then passes through a diverging rectangular lens 13 and then through a converging rectangular lens 14. The rectangular lenses 13, 14 convert the incident polarized light beam 22 into a polarized light beam 23 of an appropriate size and shape. The polarized light beam 23 then passes through a diverging lens 15 and a converging lens 16, which cause the polarized light beam 23 to expand to the size suitable to fill the single image means 4 constituted by an array of liquid crystal cells 17.

The liquid crystal cells 17 are formed by a layer of liquid crystal 18 sandwiched between opposed layers of glass 19. The image means 4 can consist of many "pixels" of liquid crystal cells. There may be, for example, 640×480 pixels. Each cell/pixel can be individually addressed by appropriate control means to determine by how much each pixel/cell rotates the polarization of light passing through it. These pixels collectively make up or generate the required graphic image to be projected. It will be appreciated that the liquid crystal cells do not have a polarizer or analyzer as is the case with a conventional liquid crystal display.

Depending on the type, liquid crystal cells rotate the polarization of light transmitted by the liquid crystal by 90° if no voltage is applied to the liquid crystal. When a voltage is applied across the liquid crystal, light is transmitted without its state of polarization being affected. In a conventional liquid crystal display, a polarizer and an analyzer that are aligned in the same direction are fixed on the front and back of the liquid crystal cell respectively. Light entering the device is polarized by the polarizer. If a voltage is applied to the liquid crystal, light passing through the liquid crystal remains in the same state of polarization and therefore passes through the analyzer; the pixel is "on." If a voltage is not applied to the liquid crystal, the state of polarization of the polarized light passing through the liquid crystal is rotated by 90° and is therefore completely blocked by the analyzer; the pixel is "off."

In another type of liquid crystal cell, the opposite applies so that the polarization of light is rotated only if a voltage is applied to the liquid crystal cell.

Thus, in the present invention, which uses the polarizing means 3, the polarized light beam 23 incident on the liquid crystal cells 17 either has its state of polarization rotated through 90° or left unaltered, according to whether or not a voltage is applied across the individual liquid crystal cells 17. Gray scale can be achieved in conventional manner by either varying the angle of rotation of the polarization or toggling between complete "on" and "off" states at varying frequencies as required, depending on how the liquid crystal cell is controlled.

The modulated light emerging from the image means 4 is preferably passed through a converging lens 24 and a diverging lens 25 to bring the light beam down to a size suitable for passing through a second polarizing cube beam splitter 26. The second polarizing cube beam splitter 26 is used in place of the analyzer conventionally attached to a liquid crystal cell in a conventional liquid crystal display device. It will be appreciated that an analyzer could be used as is conventional, instead of the second polarizing cube beam splitter 26. However, a conventional analyzer would suffer from the problem of heating by virtue of absorbing the light that it does not transmit. This problem is avoided by use of the second polarizing cube beam splitter 26 because, instead of absorbing light that is not transmitted, the non-transmitted light is deflected away as shown at 27 and can be directed to a suitable heat sink 28 if desired. Furthermore, it will be appreciated that the non-transmitted light 27 that is deflected away by the second polarizing cube beam splitter 26 is the inverse image of the light 29 that is transmitted by the second polarizing cube beam splitter 26. This inverse image could be used to be projected to a different screen from the main transmitted beam 29 so that additional lighting effects can be achieved if desired, or used for some other purpose.

The main transmitted beam 29 that passes through the second polarizing cube beam splitter 26 is preferably passed through a diverging lens 30 and then through a converging lens 31, so as to produce a final image light beam 32 of the desired size to be projected onto a wall or other screen (not shown).

The various components shown in the drawings are preferably sized so that, if desired, they can simply be fitted into a conventional projector used for lighting effects. Accordingly, in one preferred embodiment, the incoming unpolarized light beam 2 is of circular cross-sectional shape having a diameter of 65 mm. The converging lens 10 and diverging lens 11 reduce the diameter of the light beam 2 to approximately 30 mm so that most of the light enters polarizing cube beam splitter 5, which has a side of 25 mm. The emerging polarized light beam 22 is therefore of rectangular cross-sectional shape with size 25 mm×50 mm. This rectangular beam is then spread by the diverging rectangular lens 13, converging rectangular lens 14, diverging lens 15, and converging lens 16 into a beam of square cross-sectional shape having a width of 70 mm, this being the width of one type of screen containing liquid crystal display cells 17 that is presently available. The light beam emerging from the liquid crystal cells 17 is then reduced to a square beam of width 25 mm by the converging lens 24 and diverging lens 25 so that all of the light beam can enter the second polarizing cube beam splitter 26. The main transmitted beam 29 is then expanded to a width of 65 mm by the final diverging lens 30 and converging lens 31.

It will be appreciated that these sizes are mentioned by way of example only. Other combinations of lenses might be used in order to produce light beams of different shapes or sizes according to the application for the system 1.

Figure 4:
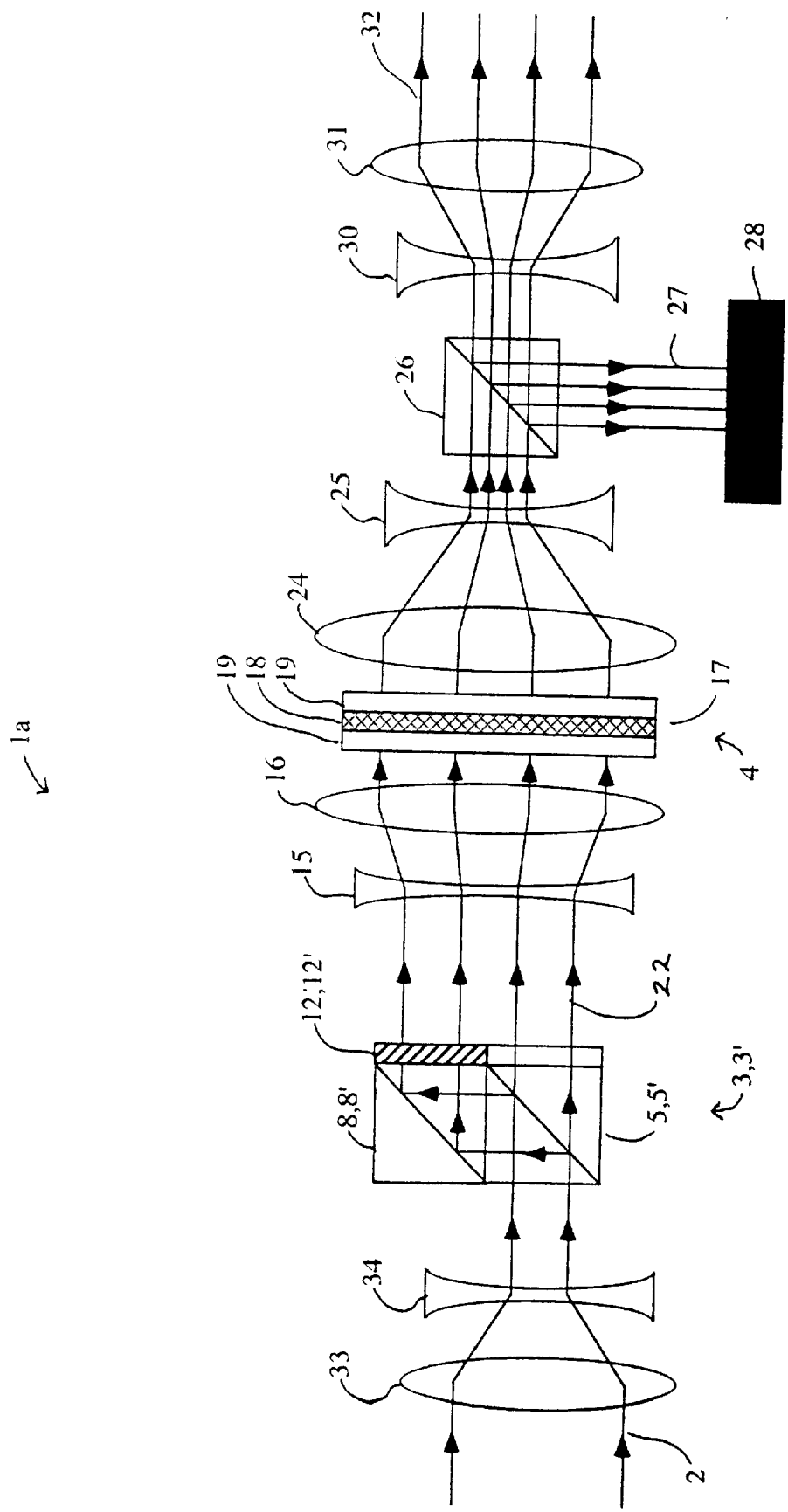
FIG. 4 is a schematic elevation of a second embodiment of a system of the present invention.
Figure 5:
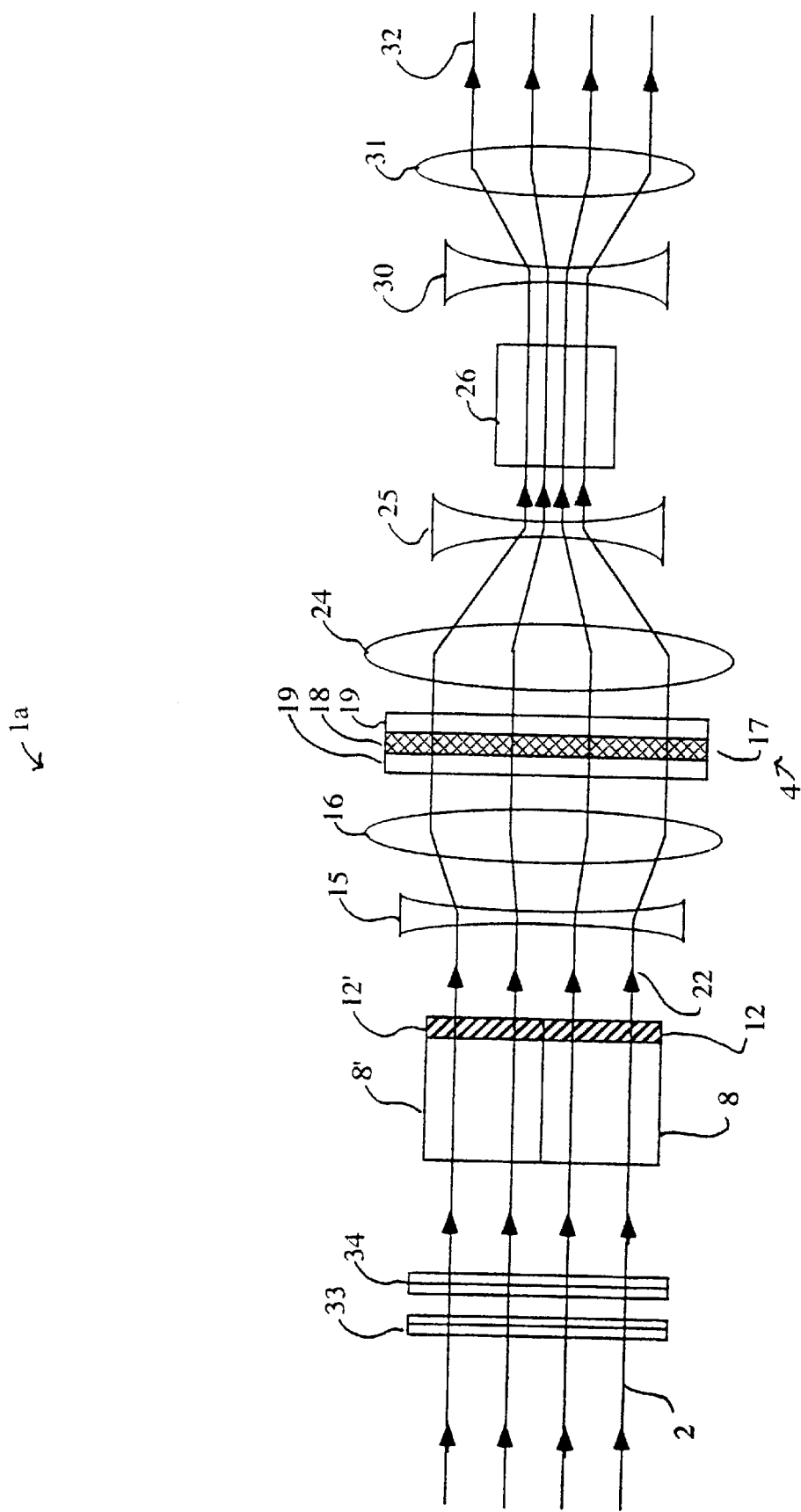
FIG. 5 is a plan view of the embodiment of FIG. 4.

The embodiment shown in FIGS. 4 and 5 is similar to the first embodiment discussed above with reference to FIGS. 1 to 3. Corresponding components have identical reference numerals and will not be further described herein. The second embodiment differs from the first embodiment in that two adjacent polarizing means 3, 3' are used to polarize the incoming unpolarized light 2. The unpolarized light unpolarized 2 passes through rectangular lenses 33, 34, which cause the light 2 to take up a shape and size suitable for entering the two adjacent polarizing cube beam splitters 5, 5'. For example, the light beam entering the polarizing cube beam splitters 5, 5' might be rectangular and have a width of 50 mm and a height of 25 mm. The emergent light beam 22, which is already square, passes directly to the diverging lens 15 and converging lens 16, which spread the polarized light beam 22 to a size suitable for entering the image means 4. The rest of the optics and apparatus is as described in the first embodiment mentioned above.

It will be appreciated that the second embodiment of the system 1a shown in FIGS. 4 and 5 uses two polarizing cube beam splitters 5, 5' instead of the single polarizing cube beam splitter 5 in the polarizing means 3. The associated increased expense is offset by the use of fewer lenses overall (the converging and diverging lenses 10, 11 and the rectangular lenses 13, 14 of the first example being replaced by the rectangular lenses 33, 34 of the second embodiment).

Whilst the light emerging from the polarizing means 3, 3' should be completely polarized in one direction, it is possible for the light to include components polarized in other directions. These components reduce the contrast of the image finally produced and projected. It may therefore be desirable to place a polarizing sheet between the polarizing means 3, 3' and the image means 4 with its plane of polarization parallel to the main direction of polarization of the light beam emerging from the polarizing means 3, 3' in order to "clean up" the light beam by removing the unwanted unpolarized components from the light beam incident on the image means 4. Such polarizing sheet should be placed distant from the image means 4 to prevent any heat that may build up in the polarizing sheet from being transferred to the liquid crystal cells 17.

In the examples described above, various lenses 10, 11, 13, 14, 15, 16, 24, 25, 30, 31, 33, 34 are used to control the size and shape of the light beam as it passes through the system 1. Some of the lenses are used particularly to increase the cross-sectional size of the light beam exiting the polarizing means 3, 3' to fill the image means 4 and to decrease the cross-sectional size of the light beam exiting the image means 4 so that it can pass into the second polarizing beam splitter 26. Now, a thick lens can cause distortion of the polarization of a polarized beam of light passing through the lens. In particular, polarized light rays on the diagonals of a thick lens (i e. those light rays that pass through the diagonals lying between an axis parallel to the direction of polarization and an axis perpendicular to the direction of polarization in the plane of the lens) have their direction of polarization rotated. This leads to a diagonal cross of light (or dark, as the case may be) projected onto the viewing screen, which is clearly undesirable. Ideally, therefore, thick lenses to adjust the size of the light beam should be avoided.

One way of overcoming the problem of thick lenses is to use an image means 4 and a second polarizing beam splitter 26 of substantially the same size and shape so that little or no manipulation of the size and shape of the polarized light beam exiting the image means 4 is required. It may be advantageous for the polarizing means 3, 3' also to be of the same size and shape as the image means 4 and the second polarizing beam splitter 26.

Another way of overcoming the problem of thick lenses is to use aspheric lenses. Such lenses are specially manufactured to behave like ideal thin lenses (for which the approximation $\sin\theta=\theta$ holds true) and therefore have no or substantially no net effect on the direction of polarization of light passing through the system as the size of the light beam is increased and decreased.

Figure 6:
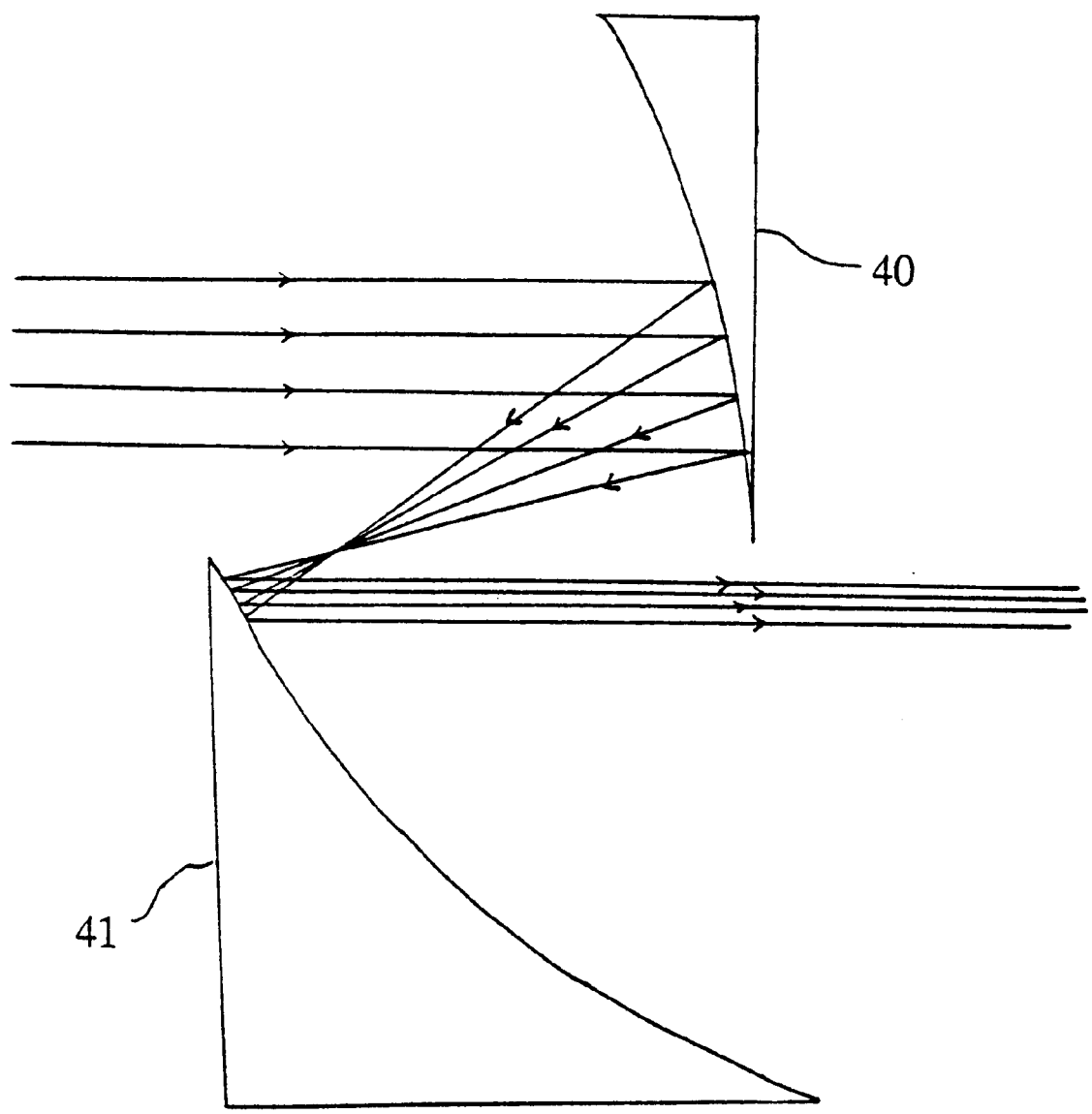
FIG. 6 is a schematic elevation showing the use of parabolic mirrors to control the size of the light beam.

A third way of overcoming the problem of thick lenses is to use parabolic mirrors to adjust the size of the light beam as necessary. This is indicated by way of example in FIG. 6. In FIG. 6, a parallel beam of light is incident on a first parabolic mirror 40 and is reflected onto a second parabolic mirror 41. The light is reflected from the second parabolic mirror 41 to be in a direction parallel to the light beam incident on the first parabolic mirror 40. In the arrangement shown in FIG. 6, the size of the light beam is reduced by reflection by the parabolic mirrors 40, 41 and thus the arrangement shown in FIG. 6 can replace the converging lens 24 and diverging lens 25 of the examples in FIGS. 1 to 5. A reverse arrangement of the parabolic mirrors 40, 41 can be used to increase the size of a light beam and can thus be used to replace the diverging lens 15 and converging lens 16 of the examples of FIGS. 1 to 5 if necessary. By definition, the angle of incidence of light incident on each of the parabolic mirrors 40, 41 in the arrangement shown is identical, and thus there is no net rotation of the polarization of any of the light reflected by the parabolic mirrors 40, 41. If the parabolic mirrors 40, 41 have no glass surfaces and are simply metallic surfaces, for example, then there will be practically no reflection losses at the parabolic mirrors 40, 41 nor distortion of the light beam.

In each example, the images that are finally projected are determined by the state of the in individual liquid crystal cells 17 in the image means 4. As mentioned above, in order to provide fine resolution, preferably many liquid crystal cells 17 are provided in the image means 4. For example, 640×480 or 800×600 liquid crystal cells 17 might be used in the image means 4. In a similar manner to a computer display screen, electronics can be provided in order to selectively drive the liquid crystal cells 17 according to the image that is to be projected. Whilst a passive matrix may be used to drive the liquid crystal cells 17, an active matrix is preferred as higher contrast can be achieved. An image to be obtained can be produced on a computerized system and appropriate voltages applied to the individually-addressable liquid crystal cells 17 of the image means 4. The image could be scanned into the computer and projected immediately, for example. Moving images can be generated by appropriate control of the liquid crystal cells 17, thus providing the possibility of projecting video images by use of a liquid crystal with sufficient image brightness to be viewed by observers. The images can be manipulated, for example rotated, morphed from one to another, distorted, rippled, etc. as desired. Using very many liquid crystal cells will provide a very high resolution display that could be suitable for projecting digitally stored cinematic films ("movies"). This would avoid the need for studios to distribute celluloid films worldwide and, on the contrary, it would be sufficient simply to transmit the digital data to cinemas via satellite, for example.

Whilst absorption of light and resultant build up of heat by the various components of the system 1 described above is minimal, especially when compared to conventional light projection systems using gobos, it may nevertheless be necessary or desirable to cool individual ones of the components. This can be achieved by using for example a sapphire window fixed to an optical component. The sapphire window allows light to pass therethrough, but is a very good conductor of heat and the heat can be removed from the sapphire by any suitable means. A cooling system may be provided for example by forced air passing through or over the system generally.

Embodiments of the present invention have been described with particular reference to the examples illustrated. However, it will be appreciated that variations and modifications may be made to the examples described within the scope of the present invention. For example, plural polarizing beam splitters may be provided after the image means 4 in place of the single polarizing cube beam splitter 26 described above, which may mean that lenses or other optical components to adjust the size of the light beam exiting the image means 4 are not required.

What is claimed is:

1. Lighting effects apparatus for producing lighting effects, the apparatus comprising:

a source of unpolarized light;

a first polarizer for converting substantially all of the light incident on the first polarizer from the source into polarized light; and, a light modulator including a second polarizer through which the polarized light is directed to modulate the polarized light beam thereby to provide a projected light beam effect, said second polarizer comprising a polarizing beam splitter capable of passing a first beam having a first planar polarization and deflecting a second beam having a second planar polarization.

2. Apparatus according to claim 1, wherein said light modulator comprises at least one liquid crystal cell.

3. Apparatus according to claim 1, wherein the light modulator comprises a plurality of pixels, each consisting of an individually-addressable liquid crystal cell.

4. Apparatus according to claim 1, further including a controller that controls said light beam modulator so as to control the projected light beam effect.

5. Lighting effects apparatus for producing lighting effects, the apparatus comprising:

a source of unpolarized light:

a first polarizer for converting substantially all of the light incident on the first polarizer from the source into polarized light;

a light modulator including a second polarizer through which the polarized light is directed to modulate the polarized light beam thereby to provide a projected light beam effect; and, at least two parabolic mirrors configured to adjust the size of the polarized light beam without any net change in the polarization of said beam.

6. Apparatus according to claim 1, further including a device for digitally storing moving lighting effects and for controlling the light beam modulator in accordance with said stored moving lighting effects to provide a projected moving light beam effect.

7. Apparatus according to claim 1, wherein said polarizing beam splitter is a polarizing cube beam splitter.

8. Apparatus according to claim 1, wherein said first polarizer comprises a polarizing beam splitter capable of passing a first beam having a first planar polarization and deflecting a second beam having a second planar polarization, a deflector for deflecting the second beam to pass in the same direction of travel as the first beam, and a polarization switch for switching the polarization of one of the first and second beams to be the same as the polarization of the other of the first and second beams, so as to produce a projection beam consisting of polarized light from the source.

9. Apparatus according to claim 8, wherein the polarizing beam splitter of said first polarizer is a polarizing cube beam splitter.

10. Apparatus according to claim 8, wherein said polarization switch is arranged to switch the polarization of the second beam.

11. Apparatus according to claim 8, wherein said polarization switch is positioned optically after the polarizing beam splitter and switches the polarization of the first beam.

12. Apparatus according to claim 8, wherein said polarization switch is a half-wave plate.

13. Apparatus according to claim 8, wherein said deflector is a deflection cube containing a mirror.

14. A method of producing lighting effects using light from a light source, the method comprising the steps of:

passing unpolarized light to a first polarizer that converts substantially all of the light incident on the first polarizer from the source into plane polarized light; and directing the polarized light through a light beam modulator including a polarizing beam splitter that passes a first beam having a first planar polarization and deflects a second beam having a second planar polarization, at least one of the first and second beams providing a projected light beam effect.

15. A method according to claim 14, further including the step of controlling the light beam modulator to control the projected light beam effect.

16. A system for producing special lighting effects, comprising:

a source of unpolarized light;

a polarizing beam splitter for receiving unpolarized light from said light source and passing a first beam having a first planar polarization and deflecting a second beam having a second planar polarization;

a deflector that deflects the second beam to pass in the same direction of travel as the first beam;

a polarization switch for switching the polarization of one of said first and second beams to be the same as the polarization of the other of said first and second beams, thereby producing a polarized beam consisting of polarized light from said first and second beams;

a light beam modulator including a second polarizing beam splitter through which said polarized light passes, thereby to provide a projected light beam effect.

17. Apparatus according to claim 16, wherein said polarization switch is a half-wave plate.

18. Apparatus according to claim 16, further including at least two parabolic mirrors configured to adjust the size of a polarized light beam without any net change in the polarization of said beam.

19. A method of producing lighting effects using a beam of incident light, comprising:

converting substantially all of the incident light into plane polarized light; and, directing the polarized light through a light beam modulator that includes a polarizing beam splitter that passes a first beam having a first planar polarization and deflects a second beam having a second planar polarization;

using at least one of the first and second beams to provide a projected light beam.

\* \* \* \* \*